(12) United States Patent
Misra et al.

(10) Patent No.: US 12,289,306 B2
(45) Date of Patent: Apr. 29, 2025

(54) SYSTEM, METHOD, AND COMPUTER PROGRAM PRODUCT FOR AUTHENTICATING A DEVICE BASED ON AN APPLICATION PROFILE

(71) Applicant: Visa International Service Association, San Francisco, CA (US)

(72) Inventors: Navendu Misra, Austin, TX (US); Pratik Jayant Sanghvi, Austin, TX (US); Vahini Mohan, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 164 days.

(21) Appl. No.: 17/785,938

(22) PCT Filed: Dec. 17, 2019

(86) PCT No.: PCT/US2019/066841
§ 371 (c)(1),
(2) Date: Jun. 16, 2022

(87) PCT Pub. No.: WO2021/126167
PCT Pub. Date: Jun. 24, 2021

(65) Prior Publication Data
US 2023/0027202 A1  Jan. 26, 2023

(51) Int. Cl.
*H04L 9/40* (2022.01)
*G06Q 20/32* (2012.01)
*G06Q 20/40* (2012.01)

(52) U.S. Cl.
CPC ....... *H04L 63/0853* (2013.01); *G06Q 20/322* (2013.01); *G06Q 20/40* (2013.01); *H04L 63/1425* (2013.01)

(58) Field of Classification Search
CPC .................. G06F 21/50; G06F 21/30
See application file for complete search history.

(56) References Cited

U.S. PATENT DOCUMENTS 8,887,286 B2 * 11/2014 Dupont .................. G06F 21/50
  726/25
9,455,988 B2    9/2016 Oberheide et al.
(Continued)

FOREIGN PATENT DOCUMENTS

WO  2019040156 A1  2/2019
WO  2019190619 A1  10/2019

OTHER PUBLICATIONS

Jakobsson et al., "Implicit Authentication for Mobile Devices", USENIX Workshop on Hot Topics in Security (HotSec), 2009, pp. 1-6.

*Primary Examiner* — Sm A Rahman
(74) *Attorney, Agent, or Firm* — The Webb Law Firm

(57) ABSTRACT

Provided are computer-implemented methods for authenticating a mobile device based on a real-time mobile device application profile which may include generating, with a mobile device application on a mobile device, a real-time mobile device application profile associated with the mobile device, receiving the mobile device application profile by the mobile device; and determining whether there is an anomaly between the real-time mobile device application profile and a historical mobile device application profile associated with the mobile device. The methods may also include performing a remedial action associated with a transaction based on determining that there is an anomaly between the real-time mobile device application profile and the historical mobile device application profile. Systems and computer program products are also provided.

20 Claims, 8 Drawing Sheets

(56) References Cited

U.S. PATENT DOCUMENTS

| | | |
|---|---|---|
| 9,942,259 B2 | 4/2018 | Madhu et al. |
| 10,911,470 B2 * | 2/2021 | Muddu ................. G06F 3/0482 |
| 11,328,289 B2 * | 5/2022 | Choi ..................... G06Q 20/20 |
| 2011/0225417 A1 | 9/2011 | Maharajh et al. |
| 2013/0191908 A1 | 7/2013 | Klein |
| 2013/0291099 A1 * | 10/2013 | Donfried ............ G06Q 30/0637 |
| | | 726/22 |
| 2015/0019425 A1 | 1/2015 | Kumar et al. |
| 2015/0365416 A1 | 12/2015 | Narayanan et al. |
| 2016/0241537 A1 | 8/2016 | Cha et al. |
| 2016/0285690 A1 | 9/2016 | Hardy |
| 2018/0293389 A1 | 10/2018 | Mahaffey et al. |
| 2021/0073819 A1 * | 3/2021 | Hernandez ......... G06Q 20/4016 |

* cited by examiner

Real-time Mobile Device Application Profile

| App. 1 Daily Usage | 15 minutes |
|---|---|
| App. 2 Daily Usage | 54 minutes |
| App. 1 Daily Memory Consumption | 225 megabytes |
| App. 1 Daily Mobile Data Usage | 67 megabytes |

Historical Mobile Device Application Profile

| App. 1 Daily Usage | 59 minutes |
|---|---|
| App. 1 Daily Memory Consumption | 944 megabytes |
| App. 1 Daily Mobile Data Usage | 102 megabytes |
| App. 3 Daily Usage | 51 minutes |

Compare the real-time mobile device application profile to a historical mobile device application profile
435

Mobile Device Application Detection System
404

Real-time Mobile Device Application Profile

| App. 1 Daily Usage | 15 minutes |
|---|---|
| App. 2 Daily Usage | 54 minutes |
| App. 1 Daily Memory Consumption | 225 megabytes |
| App. 1 Daily Mobile Data Usage | 67 megabytes |

Historical Mobile Device Application Profile

| App. 1 Daily Usage | 59 minutes |
|---|---|
| App. 1 Daily Memory Consumption | 944 megabytes |
| App. 1 Daily Mobile Data Usage | 102 megabytes |
| App. 3 Daily Usage | 51 minutes |

Mobile Device Application Detection System 404

Determine that an anomaly exists 440

FIG. 4F

SYSTEM, METHOD, AND COMPUTER PROGRAM PRODUCT FOR AUTHENTICATING A DEVICE BASED ON AN APPLICATION PROFILE

CROSS-REFERENCE TO RELATED APPLICATION

This application is the United States national phase of International Application No. PCT/US2019/066841 filed Dec. 17, 2019, the entire disclosure of which is hereby incorporated by reference in its entirety.

BACKGROUND

1. Field

This disclosure relates generally to authenticating a device and, in some non-limiting embodiments or aspects, to systems, methods, and computer program products authenticating a mobile device when a subscriber identification module (SIM) card may be compromised.

2. Technical Considerations

In a two-factor authentication protocol, a server (e.g., an email server, a banking account server, and/or the like) may receive a message from a computer (e.g., a desktop computer) associated with an individual attempting to access a resource of the individual (e.g., an email account associated with the individual maintained by the email server, a bank account associated with the individual maintained by the banking server, and/or the like). The message may include a username and a password of the individual. For additional security, after determining that the username and the password match a username and a password stored in association with the resource, the server may transmit a verification message including a one-time passcode to a mobile device (e.g., a smartphone) associated with the individual trying to access the resource. In such an example, the server may transmit the verification message to the mobile device based on a unique identifier (e.g., an international mobile subscriber identity (IMSI) number) assigned to a subscriber identification module (SIM) card in the mobile device. The verification message may cause the mobile device to display the one-time passcode and the individual to provide the one-time passcode to the server via the computer. The server may verify the identity of the individual based on the one-time passcode and authenticate the computer associated with the individual prior to providing access to the resource via the computer.

However, systems have been developed that enable an attacker (e.g., a person not permitted to access a resource of the individual) to generate a duplicate SIM card (e.g., a second SIM card that stores the unique identifier of the first SIM card located in the mobile device of the individual). In some instances, the attacker may insert the duplicate SIM card into a second mobile device and, as a result, the second mobile device may be enabled to intercept messages transmitted to the first mobile device that are intended for the individual associated with the first mobile device (e.g., a verification message generated and transmitted by the server). In a case where the attacker is attempting to access the resource of the individual, the server may receive a message including the username and password associated with the individual from the second mobile device operated by the second individual. The server may then transmit a verification message to the second mobile device based on the unique identifier of the duplicate SIM card. In response to receiving the verification message, the second mobile device may display the one-time passcode and the attacker may provide the one-time passcode as input to the server via the second mobile device. The server may verify the identity of the attacker as the identity of the individual associated with the resource based on the one-time passcode and the server may authenticate the second mobile device. The server may then provide access to the resource based on authenticating the second mobile device, thereby enabling the attacker to circumvent the two factor authentication protocol and obtain access to the resource of the first individual.

SUMMARY

Accordingly, disclosed are systems, methods, and computer program products for authenticating a mobile device based on a real-time mobile device application profile.

According to some non-limiting embodiments or aspects, provided is a computer-implemented method for authenticating a mobile device based on a real-time mobile device application profile, the computer-implemented method including: generating, with a mobile device application on a mobile device, a real-time mobile device application profile associated with the mobile device, wherein the real-time mobile device application profile comprises: data associated with memory usage of one or more mobile device applications on the mobile device; data associated with total usage of the one or more mobile device applications on the mobile device; data associated with one or more times of a day that a user interacts with the one or more mobile device applications on the mobile device; data associated with installation of the one or more mobile device applications on the mobile device; or any combination thereof; receiving, with at least one processor, the mobile device application profile by the mobile device; determining, with at least one processor, whether there is an anomaly between the real-time mobile device application profile and a historical mobile device application profile associated with the mobile device; and performing, with at least one processor, a remedial action associated with a transaction based on determining that there is an anomaly between the real-time mobile device application profile and the historical mobile device application profile.

According to some non-limiting embodiments or aspects, provided is a system for authenticating a mobile device based on a real-time mobile device application profile, including: at least one processor programmed or configured to: generate, with a mobile device application on a mobile device, a real-time mobile device application profile associated with the mobile device, receive the mobile device application profile by the mobile device; generate a historical mobile device application profile associated with the mobile device, determine whether there is an anomaly between the real-time mobile device application profile and the historical mobile device application profile associated with the mobile device; perform a remedial action associated with a transaction based on determining that there is an anomaly between the real-time mobile device application profile and the historical mobile device application profile. In some non-limiting embodiments or aspects, the real-time mobile device application profile may include: data associated with memory usage of one or more mobile device applications on the mobile device; data associated with total usage of the one or more mobile device applications on the mobile device; data associated with one or more times of a day that a user interacts with the one or more mobile device applications on the mobile device; data associated with installation of the one or more mobile device applications on the mobile device; or any combination thereof. In some non-limiting embodiments or aspects, wherein the historical mobile device application profile may include: data associated with memory usage of one or more mobile device applications on the mobile device during a time interval; data associated with total usage of the one or more mobile device applications on the mobile device during a time interval; data associated with one or more times of a day that a user interacts with the one or more mobile device applications on the mobile device during a time interval; data associated with installation of the one or more mobile device applications on the mobile device during a time interval; or any combination thereof.

According to some non-limiting embodiments or aspects, provided is a computer program product for authenticating a mobile device based on a real-time mobile device application profile, the computer program product comprising at least one non-transitory computer-readable medium comprising one or more instructions that, when executed by at least one processor, cause the at least one processor to: at least one non-transitory computer-readable medium including one or more instructions that, when executed by at least one processor, cause the at least one processor to: generate, with a mobile device application on a mobile device, a real-time mobile device application profile associated with the mobile device; receive the mobile device application profile by the mobile device; determine whether there is an anomaly between the real-time mobile device application profile and a historical mobile device application profile associated with the mobile device; perform a remedial action associated with a transaction based on determining that there is an anomaly between the real-time mobile device application profile and the historical mobile device application profile.

Further non-limiting embodiments or aspects are set forth in the following numbered clauses:

Clause 1: A computer-implemented method, comprising: generating, with a mobile device application on a mobile device, a real-time mobile device application profile associated with the mobile device, wherein the real-time mobile device application profile comprises: data associated with memory usage of one or more mobile device applications on the mobile device; data associated with total usage of the one or more mobile device applications on the mobile device; data associated with one or more times of a day that a user interacts with the one or more mobile device applications on the mobile device; data associated with installation of the one or more mobile device applications on the mobile device; or any combination thereof; receiving, with at least one processor, the real-time mobile device application profile by the mobile device; determining, with at least one processor, whether there is an anomaly between the real-time mobile device application profile and a historical mobile device application profile associated with the mobile device; and performing, with at least one processor, a remedial action associated with a transaction based on determining that there is an anomaly between the real-time mobile device application profile and the historical mobile device application profile.

Clause 2: The computer-implemented method of clause 1, further comprising: receiving, with at least one processor, a request for a transaction associated with a two-factor authentication protocol; and transmitting, with at least one processor, data associated with an authentication parameter to the mobile device based on receiving the request for the transaction associated with the two-factor authentication protocol.

Clause 3: The computer-implemented method of clauses 1 or 2, wherein generating the real-time mobile device application profile associated with the mobile device comprises: generating, with the mobile device application on the mobile device, the real-time mobile device application profile associated with the mobile device based on receiving the data associated with the authentication parameter by the mobile device.

Clause 4: The computer-implemented method of any of clauses 1-3, wherein generating the real-time mobile device application profile associated with the mobile device comprises: generating, with the mobile device application on the mobile device, the real-time mobile device application profile associated with the mobile device based on receiving the request for a transaction associated with the two-factor authentication protocol.

Clause 5: The computer-implemented method of any of clauses 1-4, further comprising: generating the historical mobile device application profile associated with the mobile device, wherein the historical mobile device application profile comprises: data associated with memory usage of one or more mobile device applications on the mobile device during a time interval; data associated with total usage of the one or more mobile device applications on the mobile device during a time interval; data associated with one or more times of a day that a user interacts with the one or more mobile device applications on the mobile device during a time interval; data associated with installation of the one or more mobile device applications on the mobile device during a time interval; or any combination thereof.

Clause 6: The computer-implemented method of any of clauses 1-5, further comprising: transmitting, with the mobile device, data associated with the one or more mobile device applications on the mobile device at a recurring time interval via an application programming interface (API).

Clause 7: The computer-implemented method of any of clauses 1-6, further comprising: receiving, with at least one processor, a request for a transaction associated with a two-factor authentication protocol, wherein the request comprises data associated with a device identifier of the mobile device; and transmitting, with at least one processor, a profile request to the mobile device based on receiving the request for the transaction associated with the two-factor authentication protocol, wherein generating the real-time mobile device application profile associated with the mobile device comprises: generating, with the mobile device application on the mobile device, the real-time mobile device application profile associated with the mobile device based on receiving the profile request.

Clause 8: A system, comprising: at least one processor programmed or configured to: generate, with a mobile device application on a mobile device, a real-time mobile device application profile associated with the mobile device, wherein the real-time mobile device application profile comprises: data associated with memory usage of one or more mobile device applications on the mobile device; data associated with total usage of the one or more mobile device applications on the mobile device; data associated with one or more times of a day that a user interacts with the one or more mobile device applications on the mobile device; data associated with installation of the one or more mobile device applications on the mobile device; or any combination thereof; receive the mobile device application profile by the mobile device; generate a historical mobile device application profile associated with the mobile device, wherein the historical mobile device application profile comprises: data associated with memory usage of one or more mobile device applications on the mobile device during a time interval; data associated with total usage of the one or more mobile device applications on the mobile device during a time interval; data associated with one or more times of a day that a user interacts with the one or more mobile device applications on the mobile device during a time interval; data associated with installation of the one or more mobile device applications on the mobile device during a time interval; or any combination thereof; determine whether there is an anomaly between the real-time mobile device application profile and the historical mobile device application profile associated with the mobile device; and perform a remedial action associated with a transaction based on determining that there is an anomaly between the real-time mobile device application profile and the historical mobile device application profile.

Clause 9: The system of clause 8, wherein the at least one processor is further programmed or configured to: receive a request for a transaction associated with a two-factor authentication protocol; and transmit data associated with an authentication parameter to the mobile device based on receiving the request for the transaction associated with the two-factor authentication protocol.

Clause 10: The system of clauses 8 or 9, wherein, when generating the real-time mobile device application profile associated with the mobile device, the at least one processor is programmed or configured to: generate, with the mobile device application on the mobile device, the real-time mobile device application profile associated with the mobile device based on receiving the data associated with the authentication parameter by the mobile device.

Clause 11: The system of any of clauses 8-10, wherein, when generating the real-time mobile device application profile associated with the mobile device, the at least one processor is programmed or configured to: generate, with the mobile device application on the mobile device, the real-time mobile device application profile associated with the mobile device based on receiving the request for a transaction associated with the two-factor authentication protocol.

Clause 12: The system of any of clauses 8-11, wherein the at least one processor is further programmed or configured to: transmit, with the mobile device, data associated with the one or more mobile device applications on the mobile device at a recurring time interval via an application programming interface (API).

Clause 13: The system of any of clauses 8-12, wherein the at least one processor is further programmed or configured to: receive a request for a transaction associated with a two-factor authentication protocol, wherein the request comprises data associated with a device identifier of the mobile device; and transmit a profile request to the mobile device based on receiving the request for the transaction associated with the two-factor authentication protocol, wherein, when generating the real-time mobile device application profile associated with the mobile device, the at least one processor is programmed or configured to: generate, with the mobile device application on the mobile device, the real-time mobile device application profile associated with the mobile device based on receiving the profile request.

Clause 14: A computer program product comprising at least one non-transitory computer-readable medium including one or more instructions that, when executed by at least one processor, cause the at least one processor to: generate, with a mobile device application on a mobile device, a real-time mobile device application profile associated with the mobile device; receive the mobile device application profile by the mobile device; determine whether there is an anomaly between the real-time mobile device application profile and a historical mobile device application profile associated with the mobile device; and perform a remedial action associated with a transaction based on determining that there is an anomaly between the real-time mobile device application profile and the historical mobile device application profile.

Clause 15: The computer program product of clause 14, wherein one or more instructions further cause the at least one processor to: receive a request for a transaction associated with a two-factor authentication protocol; and transmit data associated with an authentication parameter to the mobile device based on receiving the request for the transaction associated with the two-factor authentication protocol.

Clause 16: The computer program product of clauses 14 or 15, wherein the one or more instructions that cause the at least one processor to generate the real-time mobile device application profile associated with the mobile device, cause the at least one processor to: generate, with the mobile device application on the mobile device, the real-time mobile device application profile associated with the mobile device based on receiving the data associated with the authentication parameter by the mobile device.

Clause 17: The computer program product of any of clauses 14-16, wherein the one or more instructions that cause the at least one processor to generate the real-time mobile device application profile associated with the mobile device, cause the at least one processor to: generate, with the mobile device application on the mobile device, the real-time mobile device application profile associated with the mobile device based on receiving the request for a transaction associated with the two-factor authentication protocol.

Clause 18: The computer program product of any of clauses 14-17, wherein one or more instructions further cause the at least one processor to: generate the historical mobile device application profile associated with the mobile device, wherein the historical mobile device application profile comprises: data associated with memory usage of one or more mobile device applications on the mobile device during a time interval; data associated with total usage of the one or more mobile device applications on the mobile device during a time interval; data associated with one or more times of a day that a user interacts with the one or more mobile device applications on the mobile device during a time interval; data associated with installation of the one or more mobile device applications on the mobile device during a time interval; or any combination thereof.

Clause 19: The computer program product of any of clauses 14-18, wherein one or more instructions further cause the at least one processor to: transmit, with the mobile device, data associated with the one or more mobile device applications on the mobile device at a recurring time interval via an application programming interface (API).

Clause 20: The computer program product of any of clauses 14-19, wherein the one or more instructions further cause the at least one processor to: receive a request for a transaction associated with a two-factor authentication protocol, wherein the request comprises data associated with a device identifier of the mobile device; and transmit a profile request to the mobile device based on receiving the request for the transaction associated with the two-factor authentication protocol, wherein the one or more instructions that cause the at least one processor to generate the real-time mobile device application profile associated with the mobile device, cause the at least one processor to: generate, with the mobile device application on the mobile device, the real-time mobile device application profile associated with the mobile device based on receiving the profile request.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIGS. 4A-4G are diagrams of an implementation of a non-limiting aspect or embodiment of a process for authenticating a mobile device based on a real-time mobile device application profile.

DESCRIPTION

Figure 1:
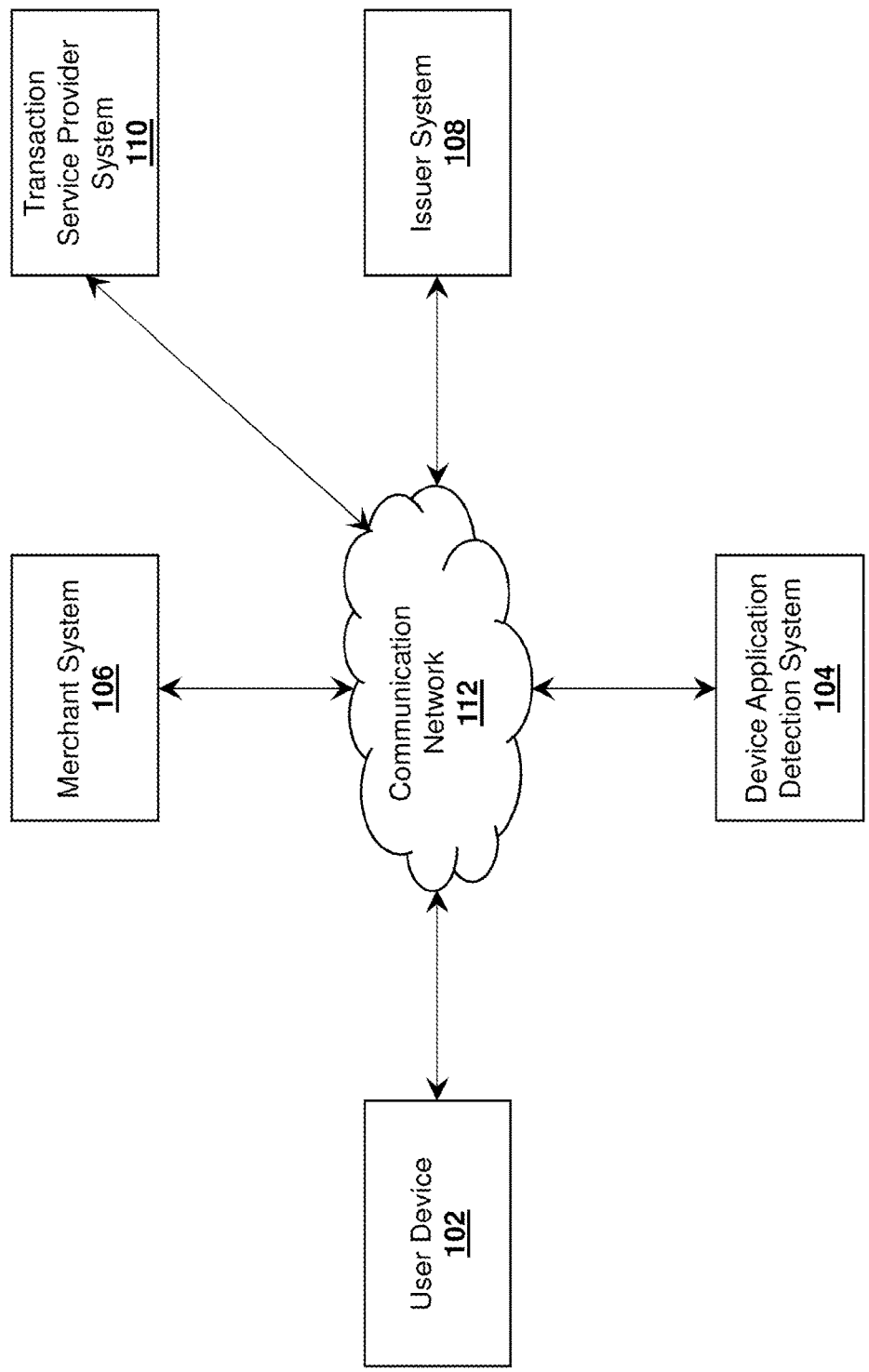
FIG. 1 is a diagram of a non-limiting aspect or embodiment of a system for authenticating a mobile device based on a real-time mobile device application profile.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a primary account number (PAN) associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile device applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "electronic wallet," "electronic wallet mobile device application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile device application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as POS devices and/or POS systems used by a merchant. In some non-limiting embodiments or aspects, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Provided are improved systems, methods, and computer program products for authenticating a mobile device based on a real-time mobile device application profile. In some non-limiting embodiments or aspects, systems, methods, and computer program products may include generating, with a mobile device application on a mobile device, a real-time mobile device application profile associated with the mobile device, receiving, with at least one processor, the mobile device application profile by the mobile device; determining, with at least one processor, whether there is an anomaly between the real-time mobile device application profile and a historical mobile device application profile associated with the mobile device; and performing, with at least one processor, a remedial action associated with a transaction based on determining that there is an anomaly between the real-time mobile device application profile and the historical mobile device application profile. The real-time mobile device application profile may include data associated with memory usage of one or more mobile device applications on the mobile device; data associated with total usage of the one or more mobile device applications on the mobile device; data associated with one or more times of a day that a user interacts with the one or more mobile device applications on the mobile device; data associated with installation of the one or more mobile device applications on the mobile device; or any combination thereof.

By virtue of the implementation of the systems, methods, and computer program products described herein, systems that provide access to a resource may determine whether an anomaly (e.g., a difference between one or more values of parameters of an application profile, such as a real-time mobile device application profile, and one or more corresponding values of parameters of a historical device application profile) exists and, when an anomaly exists, whether a remedial action should be taken. For example, when a verification message sent by a server implementing a two-factor authentication protocol to a mobile device based on a SIM card inserted therein may be intercepted by a different mobile device that has a duplicate SIM card inserted therein, the server may transmit a profile request in addition to, and or in lieu of, the verification message. The server may receive a real-time mobile device application profile generated by the mobile device that has the duplicate SIM card inserted therein and the server may compare the real-time mobile device application profile to a historical mobile device application profile. The server may determine whether an anomaly exists based on comparing the real-time mobile device application profile to the historical mobile device application profile. As such, even if the server receives input that would cause the server to verify the identity of the individual from the mobile device that has the duplicate SIM card, the server may take a remedial action (e.g., may forego authenticating the mobile device that has the duplicate SIM card and, by extension, deny access to the resource) based on determining that the anomaly exists. In this way, systems may more accurately verify the identity of an individual operating a mobile device attempting to access a resource and, by extension, more accurately determine when to take the remedial action (e.g., when to forego authenticating a mobile device attempting to access a resource). Additionally, by virtue of more accurately determining when to take the remedial action, the server may conserve resources that would otherwise be expended as a result of the authentication of the mobile device that has the duplicate SIM card. Even further, the server may forego implementing a two-factor authentication protocol involving the transmission of a verification message when requesting a real-time mobile device application profile from a mobile device attempting to access a resource, further conserving network resources that would be expended to authenticate the mobile device.

Referring now to FIG. 1, FIG. 1 is a diagram of an example environment 100 in which devices, systems, methods, and/or products described herein may be implemented. As shown in FIG. 1, environment 100 includes user device 102, device application detection system 104, merchant system 106, issuer system 108, and transaction service provider system 110. User device 102, device application detection system 104, merchant system 106, issuer system 108, and/or transaction service provider system 110 may interconnect (e.g., establish a connection to communicate, and/or the like) via wired connections, wireless connections, or a combination of wired and wireless connections.

User device 102 may include one or more devices configured to be in communication with device application detection system 104, merchant system 106, issuer system 108, and/or transaction service provider system 110 via communication network 112. For example, user device 102 may include a mobile device such as a smartphone, a tablet, a laptop computer, a desktop computer, and/or the like. In some non-limiting embodiments or aspects, user device 102 may be configured to transmit and/or receive data to and/or from another device or system (e.g., merchant system 106) via a short-range wireless communication connection (e.g., an NFC communication connection, an RFID communication connection, a Bluetooth® communication connection, and/or the like). In some non-limiting embodiments or aspects, user device 102 may be associated with a user (e.g., an individual operating a device). In some non-limiting embodiments or aspects, one or more applications may be associated with (e.g., installed and/or executed on) user device 102 (e.g., an application stored on user device 102 such as a mobile device application, a native application for a mobile device, a mobile cloud application for a mobile device, an electronic wallet application, a peer-to-peer payment transfer application, and/or the like). In some non-limiting embodiments, user device 102 may include a computer, such as a personal computer, desktop computer, and/or the like.

Device application detection system 104 may include one or more devices configured to be in communication with user device 102, merchant system 106, issuer system 108, and/or transaction service provider system 110 via communication network 112. For example, device application detection system 104 may include one or more servers, one or more groups of servers, and/or the like. In some non-limiting embodiments or aspects, device application detection system 104 may be associated with a transaction service provider and/or a payment gateway, as described herein. For example, device application detection system 104 may be included in transaction service provider system 110, as described herein.

Merchant system 106 may include one or more devices configured to be in communication with user device 102, device application detection system 104, issuer system 108, and/or transaction service provider system 110 via communication network 112. For example, merchant system 106 may include one or more servers, one or more groups of servers, and/or the like. In some non-limiting embodiments or aspects, merchant system 106 may include a point-of-sale (POS) device. In some non-limiting embodiments or aspects, merchant system 106 may be configured to communicate with user device 102 via an imaging system and/or a short-range wireless communication connection. In some non-limiting embodiments or aspects, merchant system 106 may be associated with a merchant, as described herein.

Issuer system 108 may include one or more devices configured to be in communication with user device 102, device application detection system 104, merchant system 106, and/or transaction service provider system 110 via communication network 112. For example, issuer system 108 may include one or more servers, one or more groups of servers, and/or the like. In some non-limiting embodiments or aspects, issuer system 108 may be associated with an issuer, as described herein.

Transaction service provider system 110 may include one or more devices configured to be in communication with user device 102, device application detection system 104, merchant system 106, and/or issuer system 108 via communication network 112. For example, transaction service provider system 110 may include one or more servers, one or more groups of servers, and/or the like. In some non-limiting embodiments or aspects, transaction service provider system 110 may be in communication with a data storage device, which may be local or remote to transaction service provider system 110. In some non-limiting embodiments or aspects, transaction service provider system 110 may be associated with a transaction service provider and/or a payment gateway as described herein.

Communication network 112 may include one or more wired and/or wireless networks. For example, communication network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

Figure 2:
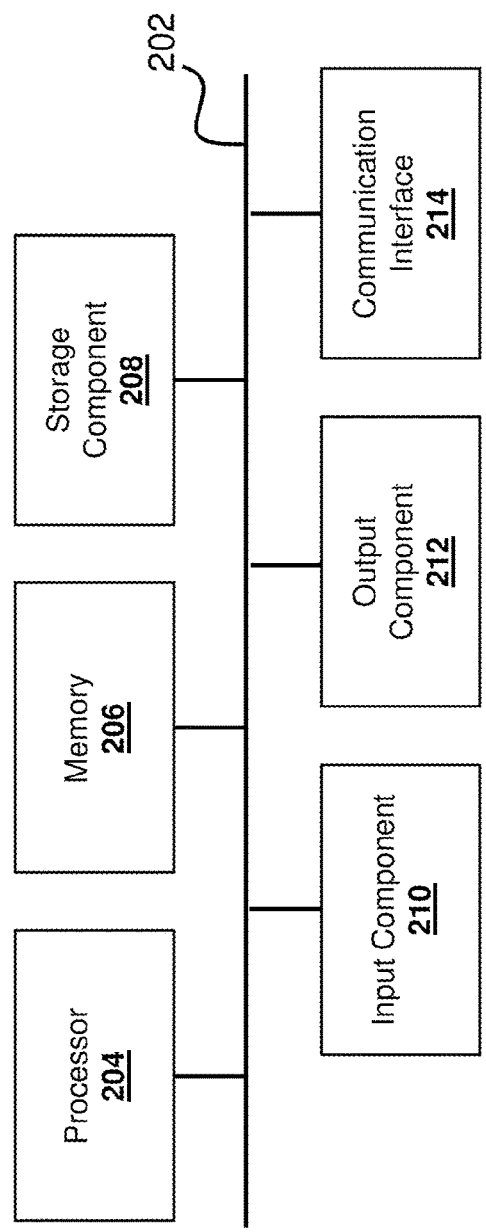
FIG. 2 is a diagram of a non-limiting aspect or embodiment of components of one or more devices and/or one or more systems of FIG. 1.

Referring now to FIG. 2, FIG. 2 is a diagram of example components of device 200. Device 200 may correspond to one or more devices of user device 102 (e.g., one or more devices of a system of user device 102), one or more devices of device application detection system 104 (e.g., one or more devices of a system of mobile device application detection system 104), one or more devices of merchant system 106 (e.g., one or more devices of a system of merchant system 106), one or more devices of issuer system 108 (e.g., one or more devices of a system of issuer system 108), one or more devices of transaction service provider system 110 (e.g., one or more devices of a system of transaction service provider system 110), and/or one or more devices of communication network 112 (e.g., one or more devices of a system of communication network 112). In some non-limiting embodiments or aspects, one or more devices of user device 102, one or more devices of device application detection system 104, one or more devices of merchant system 106, one or more devices of issuer system 108, one or more devices of transaction service provider system 110, and/or one or more devices of communication network 112 may include at least one device 200 or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include data associated with a real-time mobile device application profile, data associated with a historical mobile device application profile, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
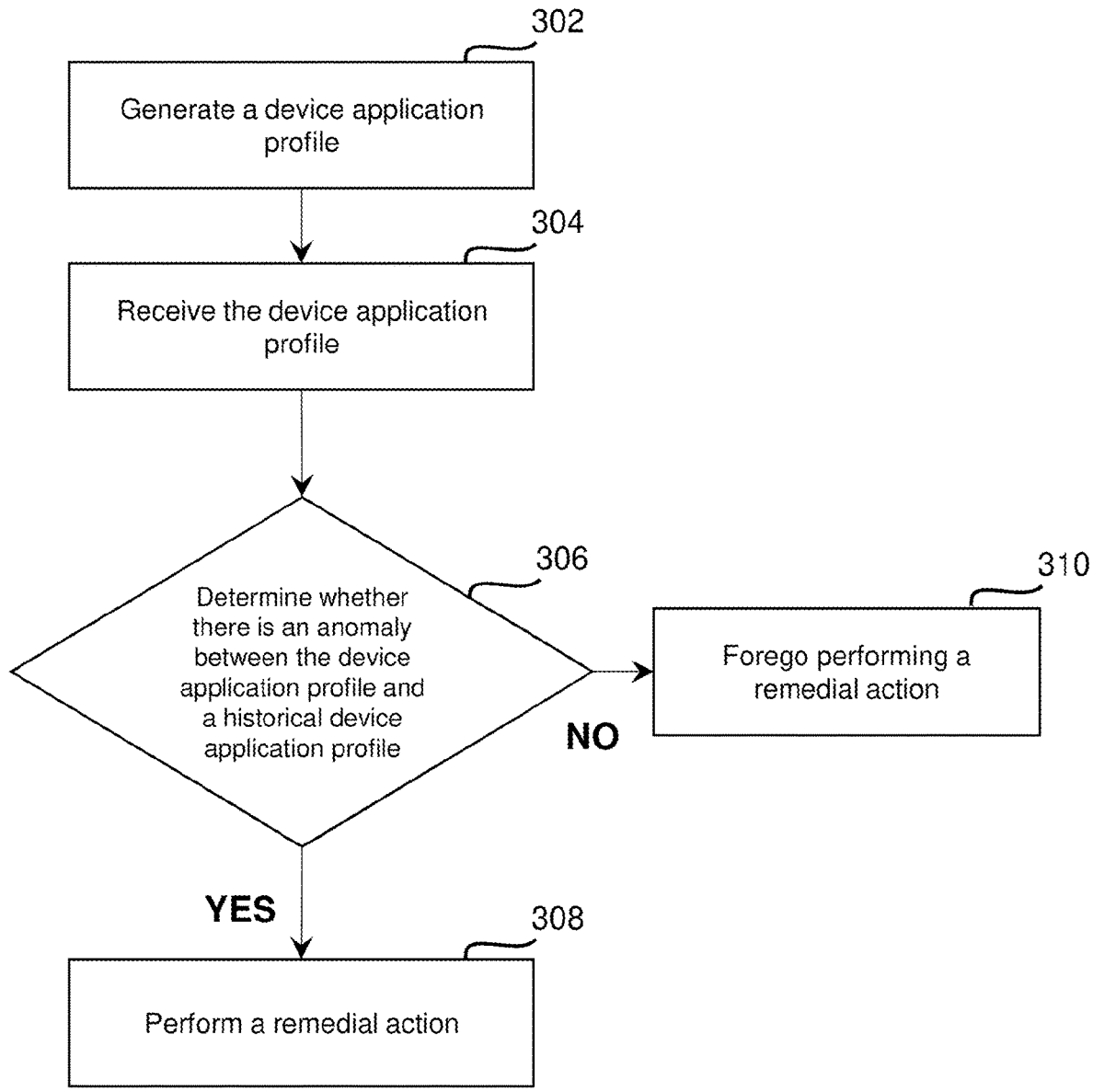
FIG. 3 is a flowchart of a non-limiting aspect or embodiment of a process for authenticating a mobile device based on a real-time mobile device application profile.

Referring now to FIG. 3, FIG. 3 is a flowchart of a non-limiting aspect or embodiment of a process 300 for authenticating a mobile device based on a real-time mobile device application profile. In some non-limiting embodiments or aspects, one or more of the functions described with respect to process 300 may be performed (e.g., completely, partially, etc.) by device application detection system 104. In some non-limiting embodiments or aspects, one or more of the steps of process 300 may be performed (e.g., completely, partially, and/or the like) by another device or a group of devices separate from and/or including device application detection system 104, such as user device 102, merchant system 106, issuer system 108, and/or transaction service provider system 110.

As shown in FIG. 3, at step 302, process 300 may include generating a device application profile. For example, user device 102 may generate a real-time mobile device application profile. In some non-limiting embodiments or aspects, user device 102 may generate the real-time mobile device application profile, where the real-time mobile device application profile is based on one or more applications (e.g., mobile device applications) associated with user device 102. For example, user device 102 may generate the real-time mobile device application profile based on one or more mobile device applications that are installed on or were installed on user device 102 in a time period (e.g., a real-time period). In some non-limiting embodiments, device application detection system 104 may generate the device application profile based on one or more applications installed on user device 102. In some non-limiting embodiments, user device 102 and/or device application detection system 104 may generate a device application profile based on one or more applications associated with user device 102 based on a profile request.

In some non-limiting embodiments or aspects, the device application profile may include data associated with memory usage of one or more applications (e.g., a navigation application, a social media application, a banking application, an electronic wallet application, and/or the like) associated with user device 102, data associated with total usage of the one or more applications (e.g., a screen time counter representing a duration of the display of one or more images on the display on user device 102 that are associated with one or more applications), a data counter associated with a measurement of data communicated to and/or from user device 102, data associated with one or more times of day that a user interacts with the one or more applications, data associated with installation of the one or more applications (e.g., an installation date on which a mobile device application was initially installed, an un-installation date on which a application was un-installed, a re-installation date on which an application was re-installed after being un-installed, and/or the like), and/or the like.

In some non-limiting embodiments or aspects, the real-time mobile device application profile may include data associated with memory usage of one or more mobile device applications (e.g., a navigation application, a social media application, a mobile banking application, an electronic wallet application, and/or the like) associated with user device 102, data associated with total usage of the one or more mobile device applications (e.g., a screen time counter representing a duration of the display of one or more images on the display on user device 102 that are associated with one or more mobile device applications that were and/or are installed on user device 102, a mobile data counter associated with a measurement of data transmitted to and/or received from user device 102 where the data is associated with one or more mobile device applications that are installed on or were installed on user device 102, and/or the like), data associated with one or more times of day that a user interacts with the one or more mobile device applications, data associated with installation of the one or more mobile device applications (e.g., an installation date on which a mobile device application was initially installed, an uninstallation date on which a mobile device application was initially uninstalled, a re-installation date on which a mobile device application was re-installed after being uninstalled, and/or the like), and/or the like.

In some non-limiting embodiments or aspects, user device 102 may generate the real-time mobile device application profile based on user device 102 receiving a profile request. For example, user device 102 may generate the real-time mobile device application profile based on receiving a profile request from device application detection system 104. In such an example, user device 102 may transmit the real-time mobile device application profile to device application detection system 104 based on generating the real-time mobile device application profile.

In some non-limiting embodiments or aspects, device application detection system 104 may generate the profile request based on device application detection system 104 receiving a request for a transaction associated with a two-factor authentication protocol (e.g., from merchant system 106 and/or the like). For example, device application detection system 104 may receive a request for a transaction associated with a two-factor authentication protocol and device application detection system 104 may determine that user device 102 is associated with the request for the transaction. In such an example, device application detection system 104 may determine that user device 102 is associated with the request for the transaction based on data associated with a device identifier of user device 102 (e.g., an IMSI number), where the data associated with the device identifier of user device 102 is included in the request for the transaction. Device application detection system 104 may determine that user device 102 is associated with the request for the transaction based on device application detection system 104 comparing the data associated with the device identifier included in the request for the transaction associated with the two-factor authentication protocol to a device identifier of user device 102 (e.g., a device identifier registered with device application detection system 104 as being associated with user device 102 and/or the like prior to device application detection system 104 receiving the request for the transaction associated with the two-factor authentication protocol). In some non-limiting embodiments or aspects, device application detection system 104 may transmit the profile request to user device 102 based on device application detection system 104 determining that the data associated with the device identifier included in the request for the transaction is associated with user device 102.

In some non-limiting embodiments or aspects, user device 102 may generate the real-time mobile device application profile based on data associated with an authentication parameter (e.g., data associated with a request for a username, data associated with a request for a password, data associated with a request for a username and password pair, and/or the like). For example, user device 102 may generate the real-time mobile device application profile based on user device 102 receiving the data associated with the authentication parameter. In such an example, user device 102 may receive the data associated with the authentication parameter from device application detection system 104.

In some non-limiting embodiments or aspects, device application detection system 104 may transmit data associated with an authentication parameter to user device 102 based on device application detection system 104 receiving a request for a transaction. For example, device application detection system 104 may transmit data associated with the authentication parameter to user device 102 based on device application detection system 104 receiving a request for a transaction from merchant system 106. In some non-limiting embodiments or aspects, device application detection system 104 may determine that the request for the transaction is associated with a two-factor authentication protocol. For example, device application detection system 104 may determine that the request for the transaction is associated with a two-factor authentication protocol and device application detection system 104 may determine the data associated with the authentication parameter based on request for the transaction and the two-factor authentication profile. In such an example, device application detection system 104 may transmit the data associated with the authentication parameter to user device 102 based on device application detection system 104 determining the data associated with the authentication protocol.

In some non-limiting embodiments or aspects, user device 102 may transmit the real-time mobile device application profile to device application detection system 104. For example, user device 102 may transmit the real-time mobile device application profile to device application detection system 104 based on user device 102 receiving the request for the mobile device application profile from device application detection system 104. In another example, user device 102 may transmit the mobile device application profile to device application detection system 104 based on user device 102 receiving the data associated with the authentication parameter from device application detection system 104. In some non-limiting embodiments or aspects, user device 102 may transmit the real-time mobile device application profile to device application detection system 104 based on user device 102 generating the real-time mobile device application profile. For example, user device 102 may transmit the real-time mobile device application profile to device application detection system 104 based on user device 102 generating the real-time mobile device application profile, where user device 102 generates the real-time mobile device application profile in response to receiving a profile request and/or an authentication parameter. In such an example, user device 102 may receive the request and/or the authentication parameter from device application detection system 104.

In some non-limiting embodiments or aspects, user device 102 may transmit the mobile device application profile to device application detection system 104 based on generating the mobile device application profile at a recurring time interval (e.g., every hour, every six hours, every day, and/or the like). For example, user device 102 may transmit the mobile device application profile to device application detection system 104 based on user device 102 generating the mobile device application profile at a recurring time interval and user device 102 may transmit the mobile device application profile to device application detection system 104 via an application programming interface (API). In some non-limiting embodiments or aspects, user device 102 may register with device application detection system 104 prior to user device 102 transmitting the mobile device application profile and device application detection system 104 may store the mobile device application profile (e.g., one or more mobile device application profiles) in a database associated with device application detection system 104.

In some non-limiting embodiments or aspects, user device 102 may transmit data associated with a real-time mobile device application profile. For example, user device 102 may transmit data associated with a real-time mobile device application profile to device application detection system 104. In such an example, the data associated with the real-time mobile device application profile may include, for example, data associated with memory usage of one or more applications, data associated with a total usage of one or more applications, data associated with one or more times of day that a user interacts with the one or more mobile device applications, data associated with installation of one or more mobile device applications, and/or the like, as described herein. In some non-limiting embodiments or aspects, user device 102 may transmit data associated with a real-time mobile device application profile at a recurring time interval. For example, user device 102 may transmit data associated with a real-time mobile device application profile to device application detection system 104 at a recurring time interval.

In some non-limiting embodiments or aspects, device application detection system 104 may generate a real-time mobile device application profile. For example, device application detection system 104 may generate a real-time mobile device application profile based on receiving data associated with the real-time mobile device application profile, as described herein. In such an example, device application detection system 104 may generate a real-time mobile device application profile based on receiving data associated with the real-time mobile device application profile from user device 102. In some non-limiting embodiments or aspects, device application detection system 104 may generate a plurality of real-time mobile device application profiles. For example, device application detection system 104 may generate a plurality of real-time mobile device application profiles based on device application detection system 104 receiving data associated with the plurality of real-time mobile device application profiles at a recurring time interval. In such an example, device application detection system 104 may generate a plurality of real-time mobile device application profiles based on device application detection system 104 receiving data associated with the plurality of real-time mobile device application profiles from user device 102 at the recurring time interval.

As shown in FIG. 3, at step 304, process 300 may include receiving the device application profile. For example, device application detection system 104 may receive the device application profile from user device 102. In some non-limiting embodiments, device application detection system 104 may receive the device application profile from user device 102 based on user device 102 receiving a profile request and/or an authentication parameter from device application detection system 104.

In some non-limiting embodiments or aspects, device application detection system 104 may receive a real-time mobile device application profile. For example, device application detection system 104 may receive the real-time mobile device application profile from user device 102. In some non-limiting embodiments or aspects, device application detection system 104 may receive the real-time mobile device application profile from user device 102 based on device application detection system 104 transmitting a profile request and/or an authentication parameter to user device 102. For example, device application detection system 104 may receive the real-time mobile device application profile from user device 102 based on device application detection system 104 transmitting a profile request and/or an authentication parameter to user device 102 to cause user device 102 to generate and transmit the real-time mobile device application profile to device application detection system 104.

In some non-limiting embodiments or aspects, device application detection system 104 may receive the real-time application profile from user device 102 at a recurring time interval. For example, device application detection system 104 may receive the real-time application profile from user device 102 based on user device 102 transmitting the real-time mobile device application profile to device application detection system 104 at a recurring time interval. In some non-limiting embodiments or aspects, device application detection system 104 may receive data associated with the one or more mobile device applications of user device 102 at a recurring time interval, as described herein. For example, device application detection system 104 may receive data associated with the one or more mobile device applications of user device 102 at a recurring time interval via an API from user device 102.

In some non-limiting embodiments or aspects, device application detection system 104 may generate a historical device application profile. For example, device application detection system 104 may generate a historical device application profile associated with user device 102. In some non-limiting embodiments or aspects, device application detection system 104 may generate the historical device application profile based on receiving data from user device 102. For example, device application detection system 104 may generate the historical device application profile based on receiving one or more device application profiles (e.g., one or more real-time device application profiles) and/or data associated with the one or more device application profiles from user device 102.

In some non-limiting embodiments or aspects, device application detection system 104 may generate the historical device application profile based on receiving data associated with the one or more applications associated with user device 102 at a recurring time interval. For example, device application detection system 104 may generate a historical device application profile at a recurring time interval that may be the same as, similar to, or different from a recurring time interval at which user device 102 transmits data associated with the historical device application profile to device application detection system 104. In some non-limiting embodiments or aspects, device application detection system 104 may generate the historical device application profile based on receiving the request for a transaction associated with the two-factor authentication protocol.

In some non-limiting embodiments or aspects, device application detection system 104 may generate the historical device application profile, where the historical device application profile includes data received and/or derived from data transmitted from user device 102 to device application detection system 104. For example, the historical device application profile may include data associated with memory usage of one or more applications on user device 102, data associated with total usage of the one or more applications on user device 102, data associated with one or more times of a day that a user interacts with the one or more applications on user device 102, data associated with installation of the one or more applications on user device 102, and/or the like. In such an example, the historical device application profile may include data associated with memory usage of one or more applications on user device 102 during a time interval, data associated with total usage of the one or more applications on user device 102 during the time interval, data associated with one or more times of a day that a user interacts with the one or more applications on user device 102 during a time interval, data associated with installation of the one or more applications on user device 102 during a time interval, and/or like data during a time interval, and/or any combination thereof.

In some non-limiting embodiments or aspects, device application detection system 104 may generate a historical mobile device application profile. For example, device application detection system 104 may generate a historical mobile device application profile associated with user device 102. In some non-limiting embodiments or aspects, device application detection system 104 may generate the historical mobile device application profile based on receiving data from user device 102. For example, device application detection system 104 may generate the historical mobile device application profile based on receiving one or more real-time mobile device application profiles and/or data associated with the one or more mobile device application profiles from user device 102.

In some non-limiting embodiments or aspects, device application detection system 104 may generate the historical mobile device application profile based on receiving data associated with the one or more mobile device applications on user device 102 at a recurring time interval. For example, device application detection system 104 may generate a historical mobile device application profile at a recurring time interval that may be the same as, similar to, or different from a recurring time interval at which user device 102 transmits data associated with the historical mobile device application profile to device application detection system 104. In some non-limiting embodiments or aspects, device application detection system 104 may generate the historical mobile device application profile based on receiving the request for the transaction associated with the two-factor authentication protocol.

In some non-limiting embodiments or aspects, device application detection system 104 may generate the historical mobile device application profile, where the historical mobile device application profile includes data received and/or derived from data transmitted from user device 102 to device application detection system 104. For example, the historical mobile device application profile may include data associated with memory usage of one or more mobile device applications on user device 102, data associated with total usage of the one or more mobile device applications on user device 102, data associated with one or more times of a day that a user interacts with the one or more mobile device applications on user device 102, data associated with installation of the one or more mobile device applications on user device 102, and/or like data, and/or any combination thereof. In such an example, the historical mobile device application profile may include data associated with memory usage of one or more mobile device applications on user device 102 during a time interval, data associated with total usage of the one or more mobile device applications on user device 102 during a time interval, data associated with one or more times of a day that a user interacts with the one or more mobile device applications on user device 102 during a time interval, data associated with installation of the one or more mobile device applications on user device 102 during a time interval, and/or like data during a time interval, and/or any combination thereof.

As shown in FIG. 3, at step 306, process 300 may include determining whether there is an anomaly between the device application profile and a historical device application profile. For example, device application detection system 104 may determine whether there is an anomaly between the device application profile (e.g., a real-time device application profile) and the historical mobile device application profile. In some non-limiting embodiments or aspects, device application detection system 104 may determine whether there is an anomaly between the device application profile and the historical mobile device application profile based on device application detection system 104 comparing the device application profile to the historical mobile device application profile. For example, device application detection system 104 may determine whether there is an anomaly between the device application profile and the historical mobile device application profile based on device application detection system 104 comparing data included in the device application profile to data included in the historical mobile device application profile. In such an example, device application detection system 104 may determine whether there is an anomaly between the device application profile and the historical mobile device application profile based on device application detection system 104 comparing values of data included in the device application profile to values of data included in the historical mobile device application profile.

In some non-limiting embodiments or aspects, device application detection system 104 may determine whether there is an anomaly between a mobile device application profile (e.g., a real-time mobile device application profile) and a historical mobile device application profile where the mobile device application profile and the historical mobile device application profile are associated with user device 102. In some non-limiting embodiments or aspects, device application detection system 104 may determine whether there is an anomaly between the mobile device application profile and a historical mobile device application profile based on device application detection system 104 comparing the mobile device application profile to the historical mobile device application profile. For example, device application detection system 104 may determine whether there is an anomaly between the mobile device application profile and a historical mobile device application profile based on device application detection system 104 comparing data included in the real-time mobile device application profile to data included in the historical mobile device application profile. In such an example, device application detection system 104 may determine whether there is an anomaly between the mobile device application profile and a historical mobile device application profile based on device application detection system 104 comparing values of data included in the real-time mobile device application profile to values of data included in the historical mobile device application profile.

In some non-limiting embodiments or aspects, device application detection system 104 may determine that there is an anomaly based on device application detection system 104 determining that a difference exits between the values of data included in the mobile device application profile and the values of data included in the historical mobile device application profile. For example, device application detection system 104 may determine that there is an anomaly based on device application detection system 104 determining that a difference between a first value of data included in the mobile device application profile and a first value of data included in the historical mobile device application profile satisfies a threshold value (e.g., a value associated with an anomaly).

As shown in FIG. 3, at step 308 ("YES"), process 300 may include performing a remedial action. For example, device application detection system 104 may perform a remedial action based on (e.g., in response to) device application detection system 104 determining that there is an anomaly between the device application profile and the historical device application profile. In some non-limiting embodiments, device application detection system 104 may perform a remedial action based on device application detection system 104 determining that there is an anomaly between a real-time mobile device application profile and a historical mobile device application profile.

In some non-limiting embodiments or aspects, device application detection system 104 may perform a remedial action associated with a transaction by causing one or more devices and/or systems associated with the transaction to forego processing the transaction. Additionally or alternatively, device application detection system 104 may perform a remedial action associated with the transaction by transmitting one or more messages. For example, device application detection system 104 may perform the remedial action associated with the transaction by transmitting one or more messages to one or more devices and/or systems involved in the transaction, the one or more messages including data associated with an indication that an anomaly was detected. In such an example, the one or more messages including data associated with an indication that an anomaly was detected may cause user device 102 to display a prompt for input to verify that the user associated with user device 102 is a user authorized to operate user device 102 (e.g., the owner of user device 102, a user authorized by the owner of user device 102, and/or the like). In some non-limiting embodiments or aspects, device application detection system 104 may perform a remedial action associated with a transaction by causing one or more devices and/or systems to forego processing transactions received after device application detection system 104 detects an anomaly.

As shown in FIG. 3, at step 310 ("NO"), process 300 may include foregoing performing a remedial action. For example, device application detection system 104 may forego performing a remedial action associated with a transaction based on device application detection system 104 determining that there is not an anomaly between the device application profile and the historical device application profile. In some non-limiting embodiments, device application detection system 104 may forego performing a remedial action associated with a transaction based on device application detection system 104 determining that there is not an anomaly between a real-time mobile device application profile and a historical mobile device application profile.

In some non-limiting embodiments or aspects, device application detection system 104 may forego performing a remedial action associated with a transaction by not causing one or more devices and/or systems associated with the transaction to forego processing the transaction. In some non-limiting embodiments or aspects, device application detection system 104 may forego performing a remedial action associated with the transaction by not transmitting one or more messages. For example, device application detection system 104 may forego performing a remedial action associated with the transaction by foregoing transmitting one or more messages to one or more devices and/or systems involved in the transaction.

Referring now to FIGS. 4A-4G, FIGS. 4A-4G are diagrams of a non-limiting embodiment or aspect of an implementation 400 relating to a process for authenticating a mobile device based on a real-time mobile device application profile. As illustrated in FIGS. 4A-4G, implementation 400 may include mobile device 402, mobile device application detection system 404, merchant system 406, and/or issuer system 408. In some non-limiting embodiments or aspects, mobile device 402 may be the same as or similar to user device 102. In some non-limiting embodiments or aspects, mobile device application detection system 404 may be the same as or similar to device application detection system 104. In some non-limiting embodiments or aspects, merchant system 406 may be the same as or similar to merchant system 106. In some non-limiting embodiments or aspects, issuer system 408 may be the same as or similar to issuer system 108.

Figure 4A:
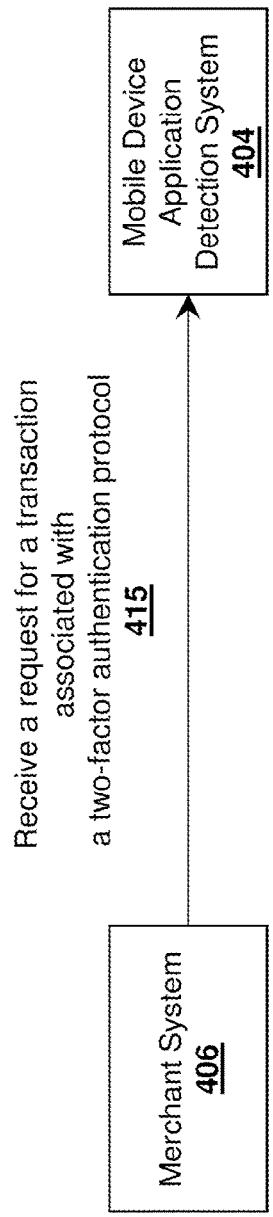

As shown by reference number 415 in FIG. 4A, mobile device application detection system 404 may receive a request for a transaction associated with a two-factor authentication protocol from merchant system 406. The request for the transaction associated with the two-factor authentication protocol may include data associated with a device identifier of the mobile device (e.g., an IMSI number).

Figure 4B:

As shown by reference number 420 in FIG. 4B, mobile device application detection system 404 may transmit a request for a real-time mobile device application profile to mobile device 402. Mobile device application detection system 404 may transmit the request for the real-time mobile device application profile to mobile device 402 in response to receiving the request for the transaction associated with the two-factor authentication protocol from merchant system 406. In some non-limiting embodiments or aspects, mobile device application detection system 404 may transmit a request for a real-time mobile device application profile to mobile device 402 based on mobile device application detection system 404 determining that mobile device 402 is associated with the transaction (e.g., that the device identifier included in the request for the transaction corresponds to mobile device 402).

Figure 4C:
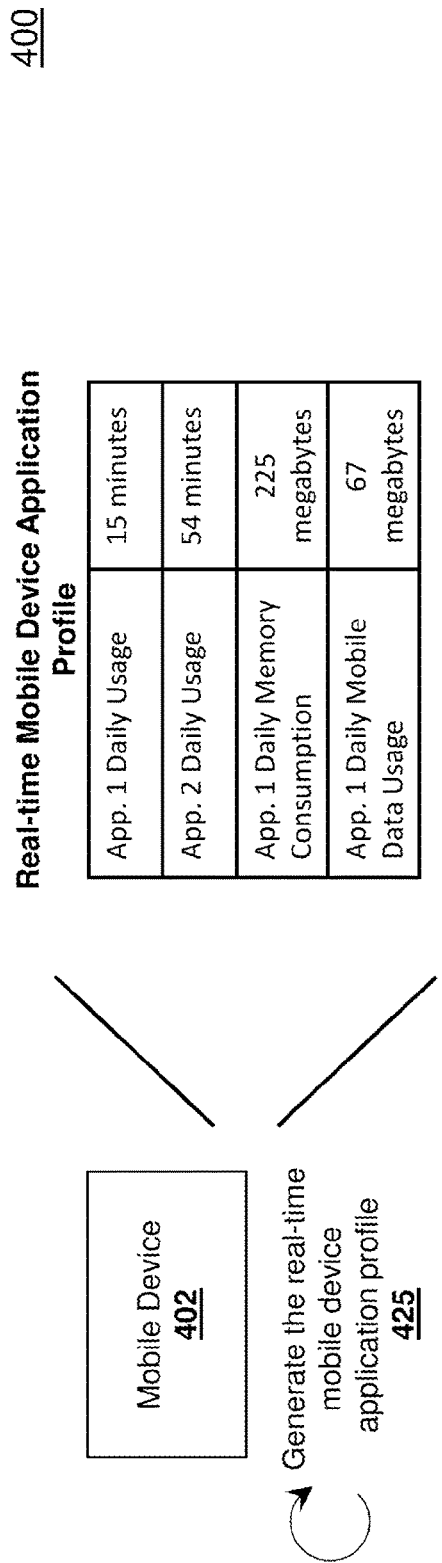

As shown by reference number 425 in FIG. 4C, mobile device 402 may generate the real-time mobile device application profile in response to receiving the request for the real-time mobile device application profile from mobile device application detection system 404.

Figure 4D:
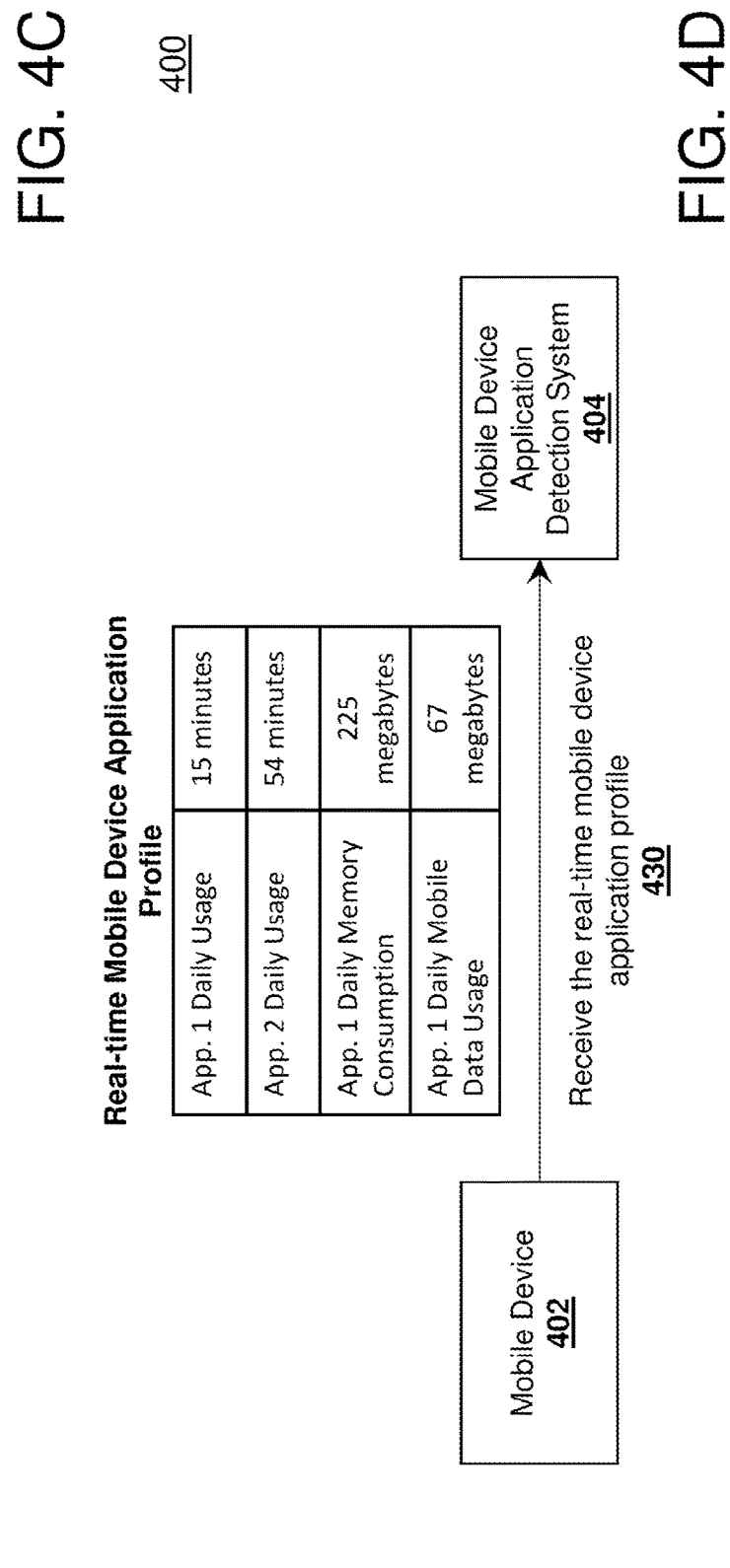

As shown by reference number 430 in FIG. 4D, mobile device application detection system 404 may receive the real-time mobile device application profile from mobile device 402.

As shown by reference number 435 in FIG. 4E, mobile device application detection system 404 may compare the real-time mobile device application profile to a historical mobile device application profile. For example, mobile device application detection system 404 may compare values of parameters of the real-time mobile device application profile to values of parameters of the historical mobile device application profile and mobile device application detection system 404 may determine (e.g., calculate) deviations between the values of parameters of the real-time mobile device application profile (e.g., real-time values of a number of mobile device applications installed on a mobile device, real-time values of an amount of time during which a mobile device application is in use, real-time values of a time interval during which a mobile device application is in use, real-time values of memory consumption of a mobile device application, and/or the like) and the values of parameters of the historical mobile device application profile (e.g., historical values of a number of mobile device applications installed on a mobile device, historical values of an amount of time during which a mobile device application was in use, historical values of a time interval during which a mobile device application was in use, historical values of memory consumption of a mobile device application, and/or the like). In some non-limiting embodiments or aspects, parameters of the real-time mobile device application profile and/or parameters of the historical mobile device application profile may include, for example, a parameter associated with daily usage of an application installed on mobile device 402, a parameter associated with daily memory consumption of an application installed on mobile device 402, a parameter associated with one or more times of a day that a user interacts with an application installed on mobile device 402, a parameter associated with an installation date, an un-installation date, and/or a reinstallation data of an application that was or is installed on mobile device 402, and/or the like. As illustrated in FIG. 4E, mobile device application detection system 404 may determine a difference between a value (e.g., "15 minutes") associated with a first parameter of the real-time mobile device application profile and a value (e.g., "59 minutes") associated with a first parameter of the historical mobile device application profile.

As shown by reference number 440 in FIG. 4F, mobile device application detection system 404 may determine that an anomaly exists. For example, mobile device application detection system 404 may determine that an anomaly exists based on a deviation between a value associated with a parameter of the real-time mobile device application profile and a value associated with a parameter of the historical mobile device application profile. In such an example, mobile device application detection system 404 may determine that the deviation satisfies a deviation threshold (e.g., a threshold associated with a difference between a value of a real-time mobile device application profile and a corresponding value of a historical mobile device application profile of mobile device 402 that, when satisfied, indicates that an anomaly exists).

Additionally, or alternatively, mobile device application detection system 404 may determine that an anomaly exists based on mobile device application detection system 404 determining that an application is not installed on mobile device 402. For example, mobile device application detection system 404 may determine that an anomaly exists based on mobile device application detection system 404 determining that an application (e.g., application 3) is not installed on mobile device 402. In such an example, mobile device application detection system 404 may determine that the application (application 3) is not installed on mobile device 402 based on mobile device application detection system 404 determining that data associated with the application (application 3) is included in the historical mobile device application profile and that data associated with the application (application 3) is not included in the real-time mobile device application profile.

Figure 4G:
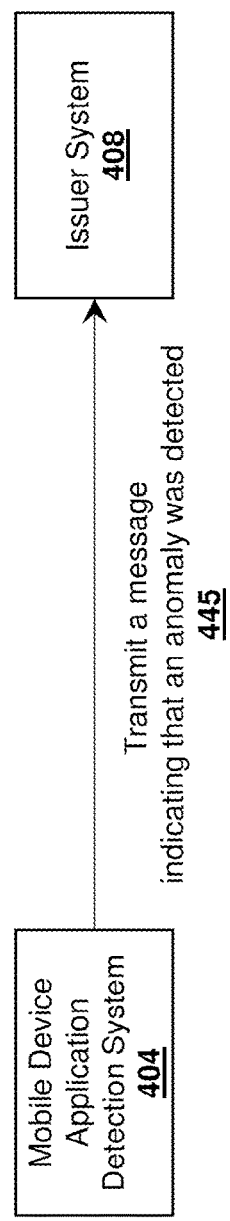

As shown by reference number 445 in FIG. 4G, mobile device application detection system 404 may transmit a message to issuer system 408 indicating that an anomaly was detected. For example, mobile device application detection system 404 may transmit a message to issuer system 408 indicating that an anomaly was detected to cause issuer system 408 to perform a remedial action (e.g., forego processing a transaction involving mobile device 402 for which the real-time mobile device application data was generated). Issuer system 408 may then take additional action (e.g., may analyze one or more parameters associated with the transaction to determine whether the transaction is a fraudulent transaction and/or the like). In some non-limiting embodiments or aspects, mobile device application detection system 404 may transmit a message (e.g., an email, a voice telephone call with a recorded message, and/or the like) to mobile device 402 and/or another computing device associated with the user associated with mobile device 402, the message including an indication that mobile device 402 may be compromised (e.g., stolen, emulated, and/or the like).

Although the above methods, systems, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method, comprising:
generating, with a mobile device application on a mobile device, a real-time mobile device application profile associated with the mobile device, wherein the real-time mobile device application profile comprises at least one of the following:
data associated with memory usage of one or more mobile device applications on the mobile device;
data associated with total usage of the one or more mobile device applications on the mobile device;

data associated with one or more times of a day that a user interacts with the one or more mobile device applications on the mobile device;
data associated with installation of the one or more mobile device applications on the mobile device; or
any combination thereof;
receiving, with at least one processor, the real-time mobile device application profile generated by the mobile device;
determining, with at least one processor, whether there is an anomaly between the real-time mobile device application profile and a historical mobile device application profile associated with the mobile device, wherein the historical mobile device application profile comprises at least one of the following:
historical data associated with memory usage of one or more mobile device applications on the mobile device;
historical data associated with total usage of the one or more mobile device applications on the mobile device;
historical data associated with one or more times of a day that a user interacts with the one or more mobile device applications on the mobile device;
historical data associated with installation of the one or more mobile device applications on the mobile device; or
any combination thereof;
wherein determining whether there is an anomaly comprises:
comparing the real-time mobile device application profile to the historical mobile device application profile; and
performing, with at least one processor, a remedial action associated with a transaction based on determining that there is an anomaly between the real-time mobile device application profile and the historical mobile device application profile, wherein performing the remedial action associated with the transaction comprises:
transmitting one or more messages to one or more devices involved in the transaction, the one or more messages including data associated with an indication that an anomaly was detected, and
foregoing processing of the transaction based on determining that there is an anomaly between the real-time mobile device application profile and the historical mobile device application profile associated with the mobile device.

2. The computer-implemented method of claim 1, further comprising:
receiving, with at least one processor, a request for a transaction associated with a two-factor authentication protocol; and
transmitting, with at least one processor, data associated with an authentication parameter to the mobile device based on receiving the request for the transaction associated with the two-factor authentication protocol.

3. The computer-implemented method of claim 2, wherein generating the real-time mobile device application profile associated with the mobile device comprises:
generating, with the mobile device application on the mobile device, the real-time mobile device application profile associated with the mobile device based on receiving the data associated with the authentication parameter by the mobile device.

4. The computer-implemented method of claim 3, wherein generating the real-time mobile device application profile associated with the mobile device comprises:
generating, with the mobile device application on the mobile device, the real-time mobile device application profile associated with the mobile device based on receiving the request for a transaction associated with the two-factor authentication protocol.

5. The computer-implemented method of claim 1, further comprising:
generating the historical mobile device application profile associated with the mobile device, wherein the historical mobile device application profile comprises:
data associated with memory usage of one or more mobile device applications on the mobile device during a time interval;
data associated with total usage of the one or more mobile device applications on the mobile device during a time interval;
data associated with one or more times of a day that a user interacts with the one or more mobile device applications on the mobile device during a time interval;
data associated with installation of the one or more mobile device applications on the mobile device during a time interval; or
any combination thereof.

6. The computer-implemented method of claim 5, further comprising:
transmitting, with the mobile device, data associated with the one or more mobile device applications on the mobile device at a recurring time interval via an application programming interface (API).

7. The computer-implemented method of claim 1, further comprising:
receiving, with at least one processor, a request for a transaction associated with a two-factor authentication protocol, wherein the request comprises data associated with a device identifier of the mobile device; and
transmitting, with at least one processor, a profile request to the mobile device based on receiving the request for the transaction associated with the two-factor authentication protocol,
wherein generating the real-time mobile device application profile associated with the mobile device comprises:
generating, with the mobile device application on the mobile device, the real-time mobile device application profile associated with the mobile device based on receiving the profile request.

8. A system, comprising:
at least one processor programmed or configured to:
generate, with a mobile device application on a mobile device, a real-time mobile device application profile associated with the mobile device, wherein the real-time mobile device application profile comprises at least one of the following:
data associated with memory usage of one or more mobile device applications on the mobile device;
data associated with total usage of the one or more mobile device applications on the mobile device;
data associated with one or more times of a day that a user interacts with the one or more mobile device applications on the mobile device;
data associated with installation of the one or more mobile device applications on the mobile device; or any combination thereof;
receive the real-time mobile device application profile generated by the mobile device;
generate a historical mobile device application profile associated with the mobile device, wherein the historical mobile device application profile comprises at least one of the following:
historical data associated with memory usage of one or more mobile device applications on the mobile device during a time interval;
historical data associated with total usage of the one or more mobile device applications on the mobile device during a time interval;
historical data associated with one or more times of a day that a user interacts with the one or more mobile device applications on the mobile device during a time interval;
historical data associated with installation of the one or more mobile device applications on the mobile device during a time interval; or
any combination thereof;
determine whether there is an anomaly between the real-time mobile device application profile and the historical mobile device application profile associated with the mobile device, wherein the one or more instructions that cause the at least one processor to determine whether there is an anomaly, cause the at least one processor to:
compare the real-time mobile device application profile to the historical mobile device application profile; and
perform a remedial action associated with a transaction based on determining that there is an anomaly between the real-time mobile device application profile and the historical mobile device application profile, wherein, when performing the remedial action associated with the transaction, the at least one processor is programmed or configured to:
transmit one or more messages to one or more devices involved in the transaction, the one or more messages including data associated with an indication that an anomaly was detected, and
forego processing of the transaction based on determining that there is an anomaly between the real-time mobile device application profile and the historical mobile device application profile associated with the mobile device.

9. The system of claim 8, wherein the at least one processor is further programmed or configured to:
receive a request for a transaction associated with a two-factor authentication protocol; and
transmit data associated with an authentication parameter to the mobile device based on receiving the request for the transaction associated with the two-factor authentication protocol.

10. The system of claim 9, wherein, when generating the real-time mobile device application profile associated with the mobile device, the at least one processor is programmed or configured to:
generate, with the mobile device application on the mobile device, the real-time mobile device application profile associated with the mobile device based on receiving the data associated with the authentication parameter by the mobile device.

11. The system of claim 10, wherein, when generating the real-time mobile device application profile associated with the mobile device, the at least one processor is programmed or configured to:
generate, with the mobile device application on the mobile device, the real-time mobile device application profile associated with the mobile device based on receiving the request for a transaction associated with the two-factor authentication protocol.

12. The system of claim 8, wherein the at least one processor is further programmed or configured to:
transmit, with the mobile device, data associated with the one or more mobile device applications on the mobile device at a recurring time interval via an application programming interface (API).

13. The system of claim 8, wherein the at least one processor is further programmed or configured to:
receive a request for a transaction associated with a two-factor authentication protocol, wherein the request comprises data associated with a device identifier of the mobile device; and
transmit a profile request to the mobile device based on receiving the request for the transaction associated with the two-factor authentication protocol,
wherein, when generating the real-time mobile device application profile associated with the mobile device, the at least one processor is programmed or configured to:
generate, with the mobile device application on the mobile device, the real-time mobile device application profile associated with the mobile device based on receiving the profile request.

14. A computer program product comprising at least one non-transitory computer-readable medium including one or more instructions that, when executed by at least one processor, cause the at least one processor to:
generate, with a mobile device application on a mobile device, a real-time mobile device application profile associated with the mobile device, wherein the historical mobile device application profile comprises at least one of the following:
data associated with memory usage of one or more mobile device applications on the mobile device;
data associated with total usage of the one or more mobile device applications on the mobile device;
data associated with one or more times of a day that a user interacts with the one or more mobile device applications on the mobile device;
data associated with installation of the one or more mobile device applications on the mobile device; or
any combination thereof;
receive the real-time mobile device application profile generated by the mobile device;
determine whether there is an anomaly between the real-time mobile device application profile and a historical mobile device application profile associated with the mobile device, wherein the historical mobile device application profile comprises at least one of the following:
historical data associated with memory usage of one or more mobile device applications on the mobile device;
historical data associated with total usage of the one or more mobile device applications on the mobile device;

historical data associated with one or more times of a day that a user interacts with the one or more mobile device applications on the mobile device;

historical data associated with installation of the one or more mobile device applications on the mobile device; or any combination thereof;

wherein the one or more instructions that cause the at least one processor to determine whether there is an anomaly, cause the at least one processor to:

compare the real-time mobile device application profile to the historical mobile device application profile; and perform a remedial action associated with a transaction based on determining that there is an anomaly between the real-time mobile device application profile and the historical mobile device application profile, wherein, the one or more instructions that cause the at least one processor to perform the remedial action associated with the transaction, cause the at least one processor to:

transmit one or more messages to one or more devices involved in the transaction, the one or more messages including data associated with an indication that an anomaly was detected, and forego processing of the transaction based on determining that there is an anomaly between the real-time mobile device application profile and the historical mobile device application profile associated with the mobile device.

15. The computer program product of claim 14, wherein one or more instructions further cause the at least one processor to:

receive a request for a transaction associated with a two-factor authentication protocol; and transmit data associated with an authentication parameter to the mobile device based on receiving the request for the transaction associated with the two-factor authentication protocol.

16. The computer program product of claim 15, wherein the one or more instructions that cause the at least one processor to generate the real-time mobile device application profile associated with the mobile device, cause the at least one processor to:

generate, with the mobile device application on the mobile device, the real-time mobile device application profile associated with the mobile device based on receiving the data associated with the authentication parameter by the mobile device.

17. The computer program product of claim 16, wherein the one or more instructions that cause the at least one processor to generate the real-time mobile device application profile associated with the mobile device, cause the at least one processor to:

generate, with the mobile device application on the mobile device, the real-time mobile device application profile associated with the mobile device based on receiving the request for a transaction associated with the two-factor authentication protocol.

18. The computer program product of claim 14, wherein one or more instructions further cause the at least one processor to:

generate the historical mobile device application profile associated with the mobile device, wherein the historical mobile device application profile comprises:

data associated with memory usage of one or more mobile device applications on the mobile device during a time interval;

data associated with total usage of the one or more mobile device applications on the mobile device during a time interval;

data associated with one or more times of a day that a user interacts with the one or more mobile device applications on the mobile device during a time interval;

data associated with installation of the one or more mobile device applications on the mobile device during a time interval; or any combination thereof.

19. The computer program product of claim 18, wherein one or more instructions further cause the at least one processor to:

transmit, with the mobile device, data associated with the one or more mobile device applications on the mobile device at a recurring time interval via an application programming interface (API).

20. The computer program product of claim 14, wherein the one or more instructions further cause the at least one processor to:

receive a request for a transaction associated with a two-factor authentication protocol, wherein the request comprises data associated with a device identifier of the mobile device; and transmit a profile request to the mobile device based on receiving the request for the transaction associated with the two-factor authentication protocol, wherein the one or more instructions that cause the at least one processor to generate the real-time mobile device application profile associated with the mobile device, cause the at least one processor to:

generate, with the mobile device application on the mobile device, the real-time mobile device application profile associated with the mobile device based on receiving the profile request.

* * * * *